No. 804,946. PATENTED NOV. 21, 1905.
W. T. HANNA.
RUNNING GEAR FOR VEHICLES.
APPLICATION FILED MAR. 27, 1905.

Witnesses
C. W. Miles
A. McCormack

Inventor
William T. Hanna
By Walter F. Murray
Attorney

UNITED STATES PATENT OFFICE.

WILLIAM T. HANNA, OF CINCINNATI, OHIO, ASSIGNOR TO MARTHA A. HANNA, OF CINCINNATI, OHIO.

RUNNING-GEAR FOR VEHICLES.

No. 804,946.  Specification of Letters Patent.  Patented Nov. 21, 1905.

Application filed March 27, 1905. Serial No. 252,418.

*To all whom it may concern:*

Be it known that I, WILLIAM T. HANNA, a citizen of the United States of America, and a resident of Cincinnati, county of Hamilton, State of Ohio, have invented certain new and useful Improvements in Running-Gear for Vehicles, of which the following is a specification.

The object of my invention is a vehicle-gear which combines firmness of construction with simplicity of parts and ease of operation.

Figure 1:
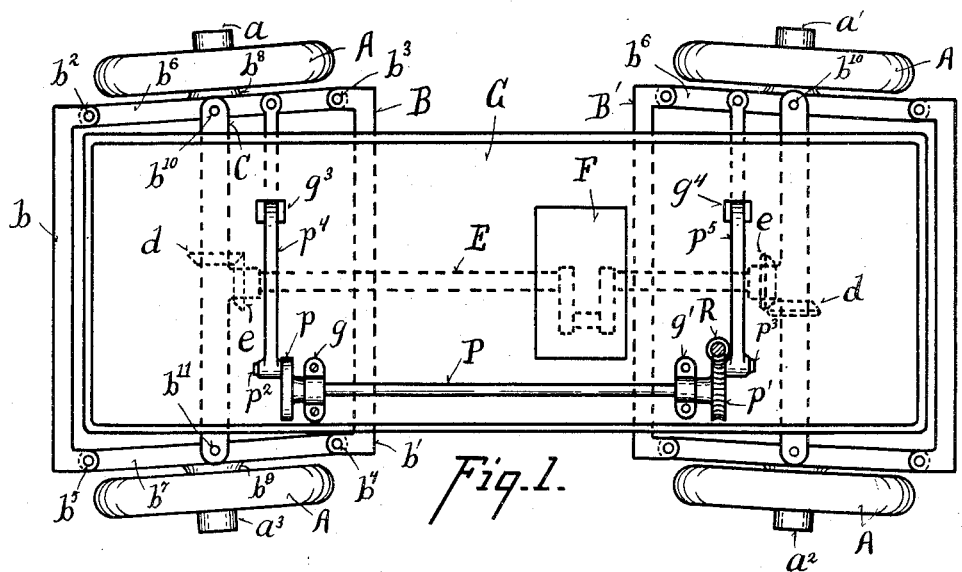
Figure 2:
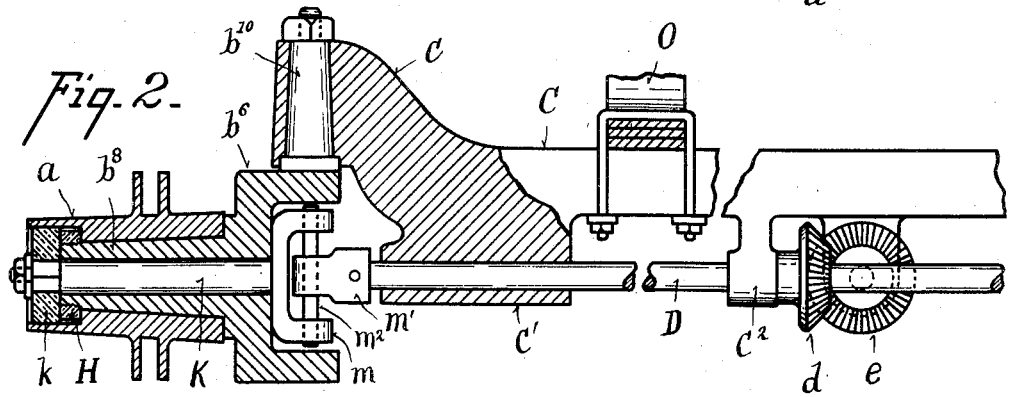
Figure 3:
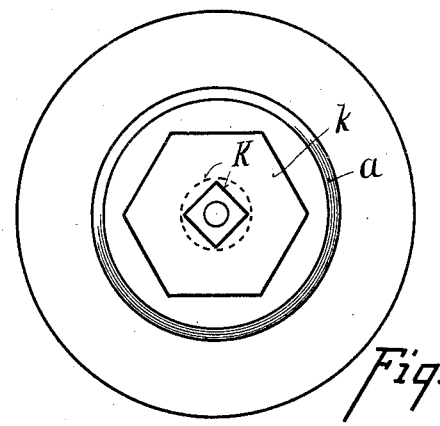
Figure 4:
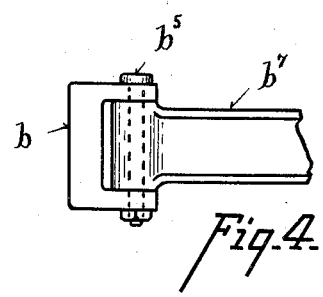

Referring to the accompanying drawings, in which like parts are indicated by similar reference-letters in the different views, Figure 1 is a plan view of a vehicle, showing the running-gear partly in full and partly in dotted line, where covered by the body of the vehicle. Fig. 2 is a detail view, partly in central cross-section through the hub and running-gear of the vehicle and partly in elevation, upon an enlarged scale. Fig. 3 is a detail elevation of the hub upon an enlarged scale. Fig. 4 is a detail elevation of one corner of a frame.

The wheels A of the vehicle are carried by front and rear flexible quadrilateral frames B B', similar in construction, so that it will be necessary to describe only one in detail. Frame B consists of transverse members $b$ $b'$, pivoted at $b^2$ $b^3$ $b^4$ $b^5$ to longitudinal members $b^6$ $b^7$. Members $b^6$ $b^7$ have projecting centrally from them and formed integral with them hollow horizontal stud-shafts $b^8$ $b^9$. Projecting vertically and centrally upward from members $b^8$ $b^9$ are pivots $b^{10}$ $b^{11}$, upon which a cross-bar C is pivoted. Cross-bar C has its ends $c$ curved upward adjacent to the pivot and has downwardly-projecting lugs $c'$ $c^2$, in which the driving-shaft D is journaled. Driving-shaft D carries a bevel gear-wheel $d$, which engages a similar gear-wheel $e$ $e$, one of which is secured upon each end of the main longitudinal shaft E, which is rotated by the motor F, secured to the body G of the vehicle. The bevel-gears $d$ upon the front and upon the rear driving-shaft D are upon opposite sides of the bevel-wheels $e$, as shown in dotted line, Fig. 1, so that the shafts D are rotated in the same direction.

The hubs $a$, $a'$, $a^2$, and $a^3$ of the wheels A are journaled upon the stud-shafts $b^8$ $b^9$, being held upon the said shafts by nuts H, which engage the screw-threaded outer ends of the studs $b^8$ $b^9$. The outer ends of the hubs $a$, $a'$, $a^2$, and $a^3$ have angular recesses, preferably hexagonal, to receive similarly-shaped nuts $k$, which are secured upon or formed integral with the outer ends of shafts $k$, which are journaled upon the interior of the stud-shafts $b^8$ $b^9$ and are secured at their inner ends to one member $m$ of a universal coupling, the other member $m'$ of the universal coupling being secured to the shaft D. The coupling-pins $m^2$, connecting the members of the universal couplings, lie in the same vertical planes which cut centrally the pivots $b^{10}$ $b^{11}$.

The vehicle-body G is supported upon springs O, which are in turn supported by the cross-bars C. The steering mechanism consists of the following parts: Upon the bottom of the vehicle-body G journal-brackets $g$ $g'$ are secured, in which a longitudinal shaft P is journaled. Shaft P carries wheels $p$ $p'$ at its ends, the wheel $p'$ having teeth upon its periphery which engage a worm R upon the steering-shaft which is to be rotated by the operator. Wheels $p$ $p'$ carry eccentric pivots $p^2$ $p^3$, which are connected by links $p^4$ $p^5$ with one of the longitudinal members $b^6$ of the frames B B', the links passing through apertures $g^3$ $g^4$ in the bottom of the vehicle-body and being coupled to the longitudinal members upon opposite sides of their pivot-points $b^{10}$ $b^{11}$ to cause the frames to be moved simultaneously in opposite directions about the pivot-points when the operator turns the shaft R.

What I claim is—

1. In a vehicle-gear the combination of a flexible frame consisting of two longitudinal and two transverse members pivoted together at their meeting-points, the longitudinal members having horizontal hollow stud-shafts secured to them, means for changing the relative positions of the members of the frame, a cross-bar pivoted at each end to the longitudinal members and adapted to support the vehicle-body, a driving-shaft carried by the cross-bar, hubs journaled upon the stud-shafts, short shafts journaled in the stud-shafts, means for connecting the outer ends of the short shafts and the hubs, means for coupling the short shafts and the driving-shaft, and means for rotating the driving-shaft.

2. A running-gear for vehicles consisting of a flexible quadrilateral frame pivoted together at the corners, hollow stud-shafts secured to and projecting centrally and horizontally outward from the longitudinal members of the frame, a cross-bar pivoted to the longitudinal members in alinement with the hollow stud-shafts, wheel-hubs journaled upon the stud-shafts, short shafts journaled within the stud-shafts, means for connecting the outer end of the short shafts to the hubs, a driving-shaft carried by the cross-bar, a universal coupling connecting the driving-shaft and the short shafts, the turning-point of the universal coupling lying in alinement with the pivots at the ends of the cross-bar, means for changing the relative positions of the members of the frame to each other, and means for rotating the driving-shaft.

3. In a vehicle-gear the combination of a flexible frame consisting of two longitudinal and two transverse members pivoted together at their meeting-points, the longitudinal members having horizontal hollow stud-shafts secured to them, means for changing the relative positions of the members of the frame, a cross-bar pivoted at each end to the longitudinal members and adapted to support the vehicle-body, a driving-shaft carried by the cross-bar, hubs journaled upon the stud-shafts, and having angular recesses in their outer ends, short shafts journaled in the stud-shafts, angular nuts of the shape of the recesses in the ends of the hubs secured upon the ends of the stud-shafts and engaging the recesses in the hubs, means for coupling the short shafts and the driving-shaft, and means for rotating the driving-shaft.

4. A vehicle-gear consisting of a front and a rear flexible frame, each frame consisting of two longitudinal and two transverse members pivoted together at their corners, the longitudinal members having horizontal hollow stud-shafts secured to them, a cross-bar for each frame pivoted at its ends to the longitudinal members of the frames, the two cross-bars being adapted to support the vehicle-body, driving-shafts carried by the cross-bars, hubs journaled upon the stud-shafts, means for connecting the outer ends of the short shafts and the hubs, means for coupling the short shafts and the driving-shafts, gear-wheels carried by each of the driving-shafts, a longitudinal main shaft carrying gear-wheels engaging the aforesaid gear-wheels, a means for rotating the main shaft, and means for changing the relative positions of the members of the frames.

WILLIAM T. HANNA.

Witnesses:
WALTER F. MURRAY,
A. McCORMACK.